(12) United States Patent
Iwuchukwu

(10) Patent No.: US 8,750,845 B2
(45) Date of Patent: Jun. 10, 2014

(54) METHOD AND APPARATUS FOR PROVIDING TILES OF DYNAMIC CONTENT

(75) Inventor: Tochukwu Iwuchukwu, Mountain View, CA (US)

(73) Assignee: Nokia Corporation, Espoo (FI)

( * ) Notice: Subject to any disclaimer, the term of this patent is extended or adjusted under 35 U.S.C. 154(b) by 963 days.

(21) Appl. No.: 12/711,990

(22) Filed: Feb. 24, 2010

(65) Prior Publication Data

US 2011/0207446 A1 Aug. 25, 2011

(51) Int. Cl.
- *H04L 29/06* (2006.01)
- *G06T 15/00* (2011.01)
- *G06T 15/10* (2011.01)
- *G06T 11/40* (2006.01)
- *G09G 5/00* (2006.01)
- *G06F 15/16* (2006.01)
- *H04W 4/02* (2009.01)
- *H04W 4/00* (2009.01)
- *H04W 4/12* (2009.01)

(52) U.S. Cl.
USPC ........ 455/414.3; 345/419; 345/427; 345/552; 345/672

(58) Field of Classification Search
CPC ............ H04W 4/02; H04W 4/00; H04W 4/12
USPC ............ 434/66; 345/419, 427, 552, 217, 231; 709/203, 217; 715/792, 800, 840, 862; 455/414.3
See application file for complete search history.

(56) References Cited

U.S. PATENT DOCUMENTS

| | | | |
|---|---|---|---|
| 6,148,377 A | 11/2000 | Carter et al. | |
| 6,192,393 B1 | 2/2001 | Tarantino et al. | |
| 7,599,790 B2 | 10/2009 | Rasmussen et al. | |
| 2002/0123334 A1* | 9/2002 | Borger et al. | 455/419 |
| 2004/0217980 A1* | 11/2004 | Radburn et al. | 345/672 |
| 2005/0258256 A1* | 11/2005 | Jones et al. | 235/494 |
| 2007/0229524 A1 | 10/2007 | Hendrey et al. | |
| 2008/0178125 A1 | 7/2008 | Elsbree et al. | |
| 2008/0288248 A1* | 11/2008 | Monkowski | 704/222 |
| 2008/0320413 A1 | 12/2008 | Oshiro et al. | |
| 2009/0037441 A1 | 2/2009 | Howell et al. | |
| 2010/0047744 A1* | 2/2010 | Miura | 434/66 |
| 2010/0077056 A1* | 3/2010 | Kokal et al. | 709/217 |
| 2010/0115462 A1 | 5/2010 | Spencer et al. | |
| 2010/0198684 A1* | 8/2010 | Eraker et al. | 705/14.49 |

* cited by examiner

*Primary Examiner* — Inder Mehra
(74) *Attorney, Agent, or Firm* — Ditthavong MORI & STEINER, P.C.

(57) ABSTRACT

Some techniques for providing tiles of dynamic content include a service that determines a generation time and update time in response to receiving a request for a particular tile, and that returns the particular tile. The generation time is when the particular tile of dynamic content was most recently generated based on particular vector data associated with the particular tile. The update time is when the particular vector data was most recently updated. The particular tile is generated based on the particular vector data in response to determining that the generation time is not later than the update time. Some techniques include a client that receives data that indicates an estimated time to complete generation of a tile in response to sending a first request for the tile. A second request for the tile is sent at a time based at least in part on the estimated time.

29 Claims, 9 Drawing Sheets

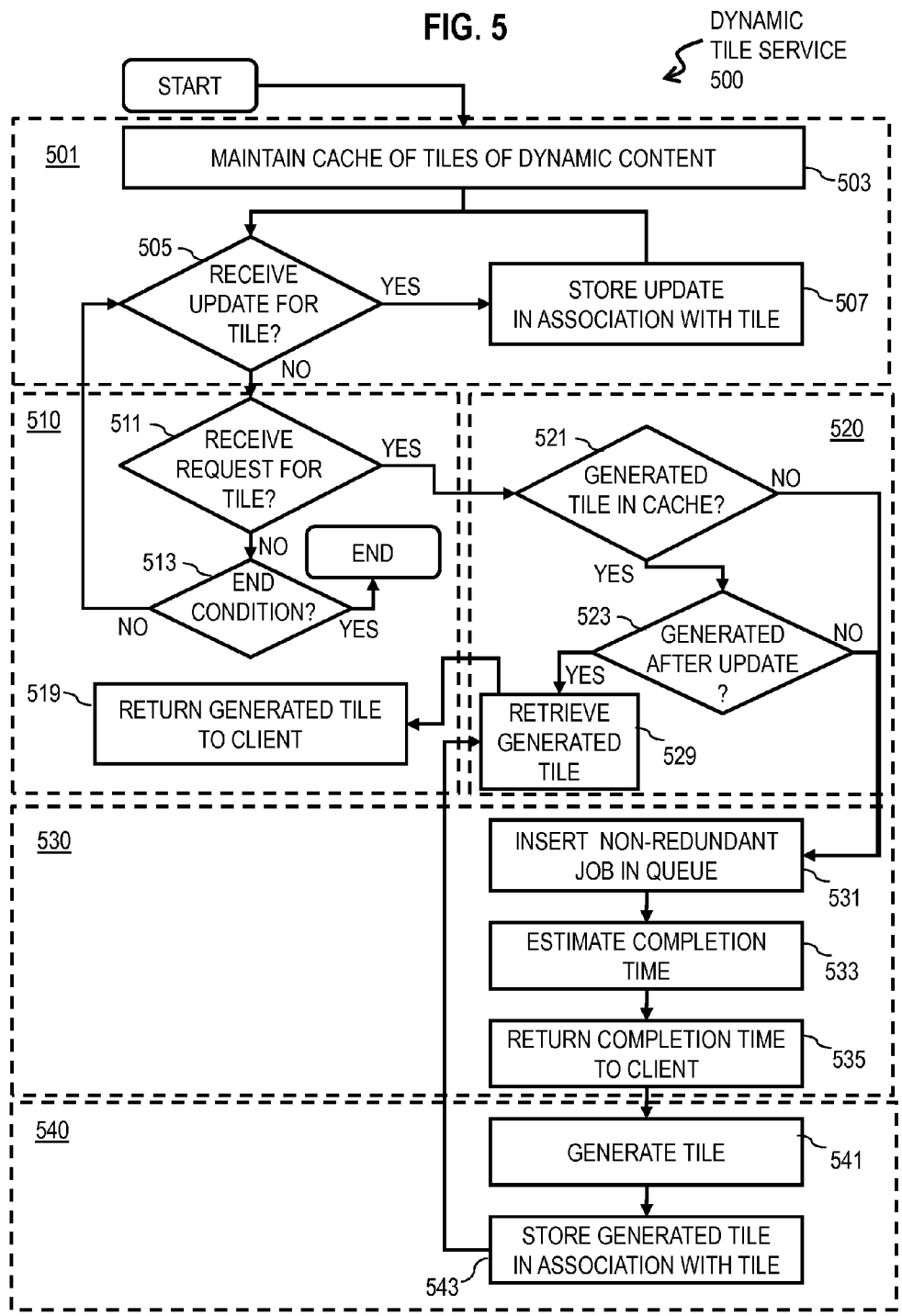

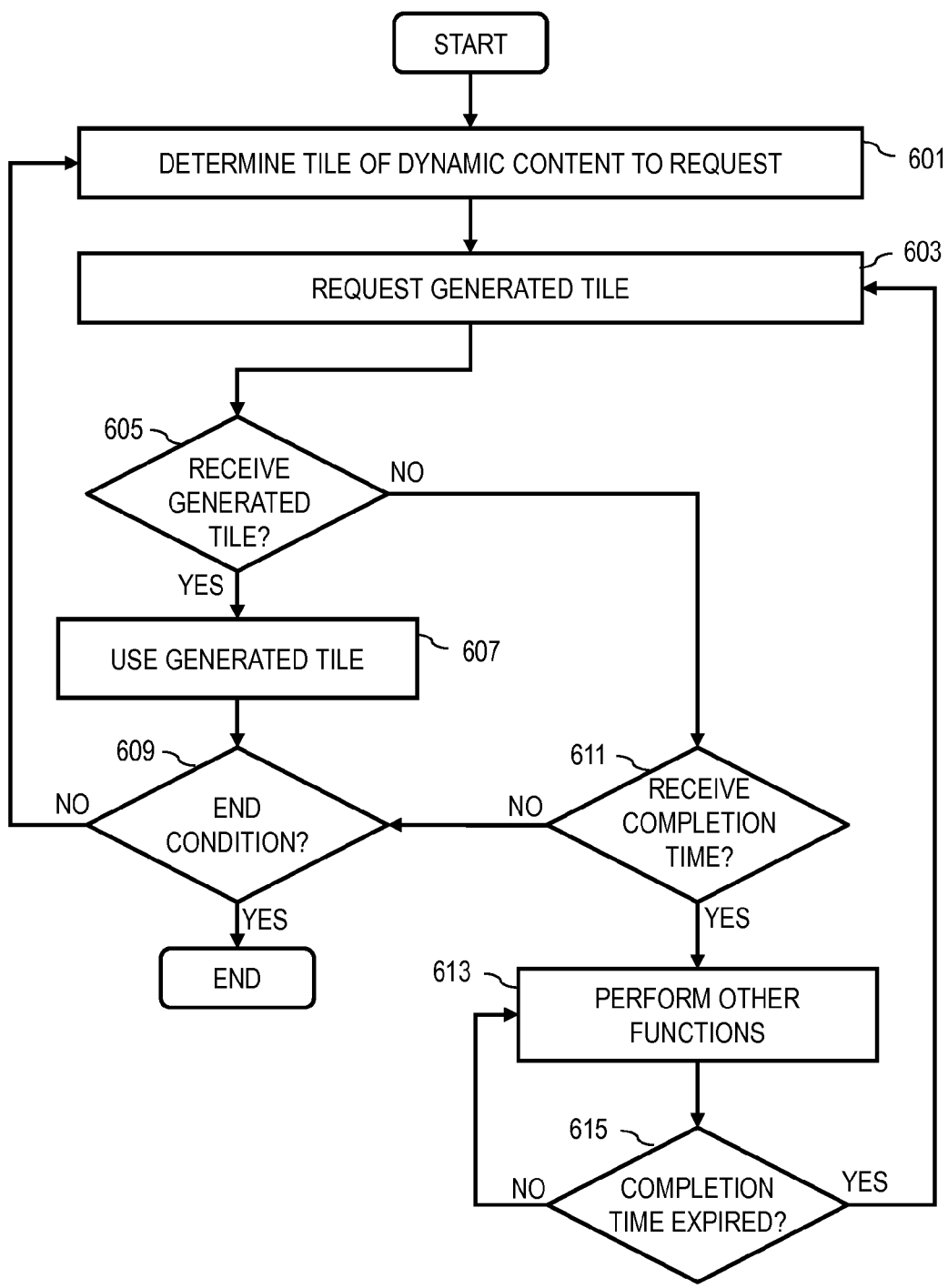

METHOD AND APPARATUS FOR PROVIDING TILES OF DYNAMIC CONTENT

BACKGROUND

Service providers (e.g., wireless, cellular, etc.) and device manufacturers are continually challenged to deliver value and convenience to consumers by, for example, providing compelling network services. An example network service is providing current traffic information for navigation systems. While map information is rather static, changing slowly over decades; traffic information is dynamic, sometimes changing dramatically over minutes. For example, congestion can develop quickly on certain road segments because of a particular accident. The dynamic content is also very dense; a map image with traffic information combined typically involves tens of thousands of picture elements (pixels) each comprising dozens of bits of information.

Providing current traffic information to consumers of navigation systems is a great challenge. For example, one traffic service may comprise millions of road segments and tens of thousands of traffic updates to be used to generate map images of millions of bits to be sent to hundreds of thousands of consumers. The wireless device used by each consumer is typically limited in processor, storage, bandwidth, display, and battery power capacity; so, much processing is done on the service provider equipment. Providing such a service can expend much of the resources on the equipment assigned to the service, clog valuable bandwidth in communications networks and become prohibitive as the number of consumers increases. Often, a consumer device that requested the traffic information stands idle, waiting for a response from the service and thus wasting computational resources on the consumer device.

SOME EXAMPLE EMBODIMENTS

Therefore, there is a need for an approach for providing dynamic and dense content, like combined map and traffic information, which does not suffer one or more disadvantages of prior approaches.

According to one embodiment, a method comprises facilitating access, including granting access rights, to an interface to allow access to a service via a network. The service is configured to, in response to receiving a request for a particular tile of dynamic content, determine a generation time and an update time. The generation time is a time when the particular tile of dynamic content was most recently generated based on particular vector data associated with the particular tile. The update time is a time when the particular vector data was most recently updated. The service further is configured to determine whether the generation time is later than the update time. The service further is configured to cause the particular tile to be generated based on the particular vector data in response to determining that the generation time is not later than the update time. The method further comprises returning the particular tile of dynamic content via the network.

According to another embodiment, a method comprises, in response to causing a first request for a particular tile of dynamic content to be sent, receiving data that indicates an estimated time to complete generation of the particular tile. The method further comprises causing a second request for the particular tile to be sent at a time based at least in part on the estimated time.

According to another embodiment, an apparatus comprising at least one processor, and at least one memory including computer program code, the at least one memory and the computer program code configured to, with the at least one processor, cause, at least in part, the apparatus to, in response to receiving a request for a particular tile of dynamic content, determine a generation time and an update time. The apparatus is further caused to determine whether the generation time is later than the update time. The apparatus is further caused to cause the particular tile to be generated based on the particular vector data in response to determining that the generation time is not later than the update time. The apparatus is further caused to cause the particular tile of dynamic content to be returned.

According to another embodiment, an apparatus comprising at least one processor, and at least one memory including computer program code, the at least one memory and the computer program code configured to, with the at least one processor, cause, at least in part, the apparatus to, in response to causing a first request for a particular tile of dynamic content to be sent, receive data that indicates an estimated time to complete generation of the particular tile. The apparatus is further caused to cause a second request for the particular tile to be sent at a time based at least in part on the estimated time.

According to another embodiment, a computer-readable storage medium carrying one or more sequences of one or more instructions which, when executed by one or more processors, cause, at least in part, an apparatus to, in response to receiving a request for a particular tile of dynamic content, determine a generation time and an update time. The apparatus is also caused to determine whether the generation time is later than the update time. The apparatus is further caused to cause the particular tile to be generated based on the particular vector data in response to determining that the generation time is not later than the update time. The apparatus is further caused to cause the particular tile of dynamic content to be returned.

According to another embodiment, a computer-readable storage medium carrying one or more sequences of one or more instructions which, when executed by one or more processors, cause, at least in part, an apparatus to, in response to causing a first request for a particular tile of dynamic content to be sent, receive data that indicates an estimated time to complete generation of the particular tile. The apparatus is further caused to cause a second request for the particular tile to be sent at a time based at least in part on the estimated time.

According to another embodiment, an apparatus comprises means for determining a generation time and update time in response to receiving a request for a particular tile of dynamic content. The apparatus also comprises means for determining whether the generation time is later than the update time. The apparatus further comprises means for causing the particular tile to be generated based on the particular vector data in response to determining that the generation time is not later than the update time. The apparatus further comprises means for causing the particular tile of dynamic content to be returned.

According to another embodiment, an apparatus comprises means for receiving data that indicates an estimated time to complete generation of a particular tile in response to causing a first request for the particular tile of dynamic content to be sent. The apparatus further comprises means for causing a second request for the particular tile to be sent at a time based at least in part on the estimated time.

According to another embodiment, a computer program product includes one or more sequences of one or more instructions which, when executed by one or more processors, cause an apparatus to at least perform determining a generation time and update time in response to receiving a request for a particular tile of dynamic content. The apparatus is also caused at least to perform determining whether the generation time is later than the update time. The apparatus is also caused at least to perform causing the particular tile to be generated based on the particular vector data in response to determining that the generation time is not later than the update time. The apparatus is also caused at least to perform causing the particular tile of dynamic content to be returned.

According to another embodiment, a computer program product includes one or more sequences of one or more instructions which, when executed by one or more processors, cause an apparatus to at least perform, in response to causing a first request for a particular tile of dynamic content to be sent, receiving data that indicates an estimated time to complete generation of the particular tile. The apparatus is also caused at least to perform causing a second request for the particular tile to be sent at a time based at least in part on the estimated time.

According to another embodiment, a computer readable storage medium comprises a data structure configured for an apparatus that provides a tile of dynamic content. The data structure comprises data that indicates a tile suitable for rendering on user equipment and vector data suitable for generating the tile. The data structure further comprises data that indicates a generation time and an update time.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 is a flowchart of a process for a dynamic tile service, according to one embodiment;

FIG. 6 is a flowchart of a process for a dynamic tile client, according to one embodiment;

DESCRIPTION OF SOME EMBODIMENTS

Figure 1:
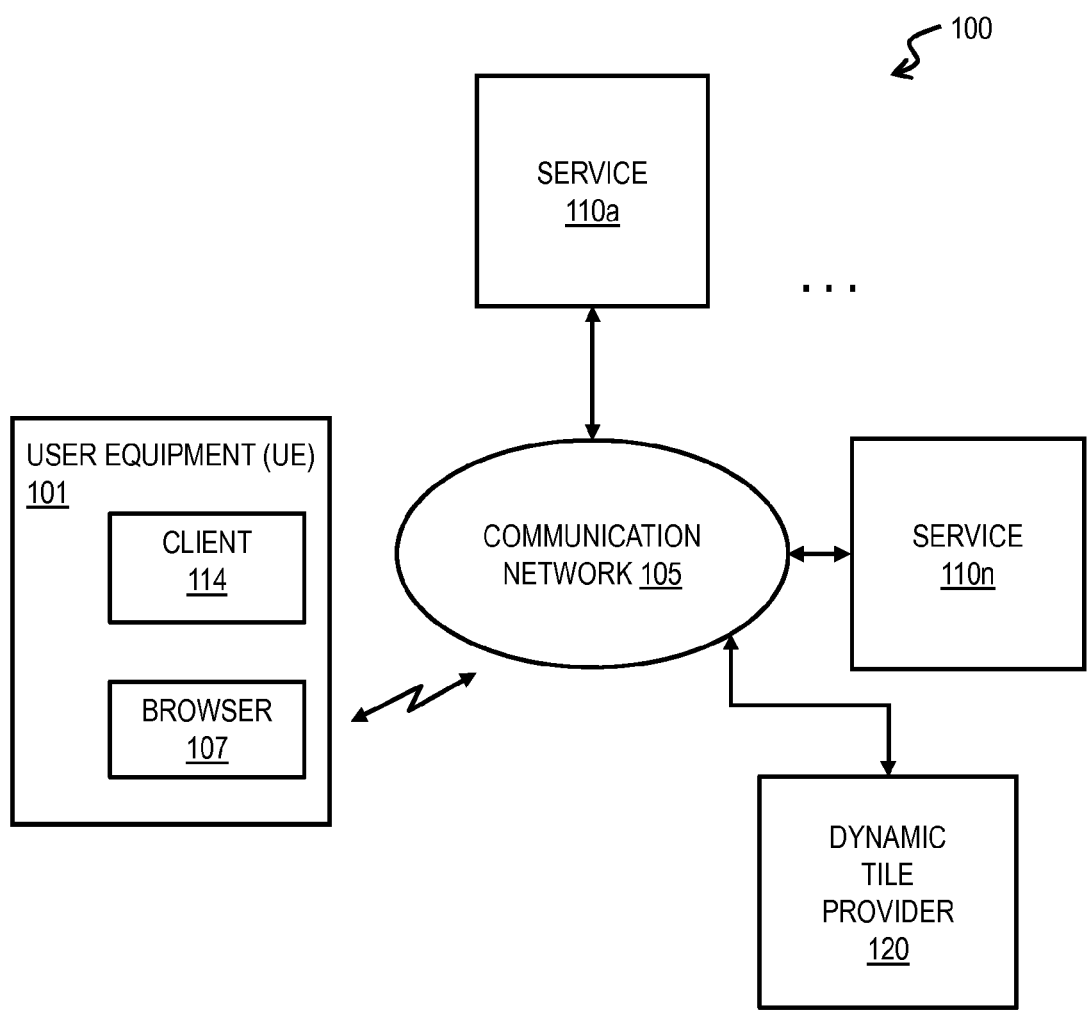
FIG. 1 is a diagram of a system capable of providing tiles of dynamic content according to one embodiment.

Examples of a method, apparatus, and computer program are disclosed for providing tiles of dynamic content (called dynamic tiles, hereinafter). In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the terms content or media refer to any digital data that can be presented for human perception, for example, digital sound, songs, digital images, digital games, digital maps, point of interest information, digital videos (such as music videos, news clips and theatrical videos), advertisements, program files or objects, any other digital media or content, or any combination thereof. The term rendering indicates any method for presenting the content to a human user, including playing music through speakers, displaying images on a screen or in a projection or on tangible media such as photographic or plain paper, showing videos on a suitable display device with sound, graphing game or map data, music or video playback or streaming, games playing, image or map displaying, radio or television content broadcasting or streaming, or any other term of art for presentation, or any combination thereof.

As used herein dynamic content refers to content that changes with time, such as a map of current traffic information, or web page with news items, or an audio clip or video clip of a news feed. A tile is an atomic portion of content that is sent from a service to user equipment for rendering on user equipment. A tile of dynamic content is called a dynamic tile herein for convenience. Vector data associated with a tile refers to data that is not directly rendered on user equipment but is used to generate a tile that can be rendered on user equipment. For example, vector map data includes coordinates, colors and thicknesses of line segments used by a drawing process to generate a map of pixels for rendering on user equipment. Similarly, text is vector data used by a text-to-speech process to generate an audio clip for rendering on user equipment.

An individual consumer typically uses only a portion of the combined map and traffic information, so the information is conveniently divided into individually communicated tiles of dynamic content, such as pixels that indicate combined map and traffic information for a portion of the map. Similarly, consumers of other dynamic content, such as audio, video, web pages, game screens, may use only a portion of all the available content at any one time, such as a video clip or sound clip from a more extensive stream, or one of many web pages, or one of several game screens.

Although various embodiments are described with respect to tiles of dynamic traffic data for navigation maps, it is contemplated that the approach described herein may be used with other dynamic content delivered on demand (i.e., when requested by a consumer) as tiles from a service, where the tile is generated from vector data. For example, in some embodiments, a tile comprises pixels for a two dimensional portion of a road map; and the vector data includes time variable data that indicates colors associated with traffic congestion for road segments within the particular tile, or time-variable data that indicates locations of one or more persons who satisfy first criteria (such as being friends of an individual or members of an organization), or time variable data that indicates locations of one or more establishments that satisfy second criteria (such as currently open for business), among others, or some combination.

In some embodiments, a tile comprises a portion of a web page; and vector data comprises time variable data for the portion of the web page at a certain time. In some embodiments, a tile comprises a portion of a sound track or video stream; and vector data includes data that indicates time-variable text to be converted to speech, or time-variable data that indicates intensity level for each of one or more audio or optical wavelength bands, or time-variable data that indicates amplification level for each of one or more wavelength bands, or time-variable data that indicates expansion level for one or more time or distance bands, among others, or some combination.

According to various embodiments described in more detail below, a tile of dynamic content is only generated for rendering on a consumer's device when both the content for a tile has been updated, as indicated by an update to the vector data, and a consumer has requested that tile. This is called update-limited on-demand generation of dynamic tiles. The generated tiles are cached for re-use while there is no update. In various embodiments, redundant entries in a generation job queue are prevented so that the generation of the tile is only performed once, even if several consumers request the same tile shortly after an update. This offers the advantage of conserving resources on service equipment by not generating a tile if no consumer requests it, not generating the same tile multiple times, and by re-using a generated tile in cache for all consumers requesting it until another update causes a change in the content of the tile. A dynamic tile provider service, described below is a means for obtaining these advantages.

FIG. 1 is a diagram of a system 100 capable of providing tiles of dynamic content according to one embodiment. As shown in FIG. 1, the system 100 comprises a user equipment (UE) 101 having connectivity to one or more services 110*a* through 110*n* (collectively referenced hereinafter as services 110) via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

System 100 also includes a dynamic tile provider system (e.g., server) 120, described in more detail below, which provides update-limited on-demand tiles of dynamic content to one or more of services 110 or to one or more processes executing on UE 101. In various embodiments, dynamic tile provider server 120 caches previously generated tiles and vector data for generating those tiles as well as data indicating a generation time that the cached tile was most recently generated from the vector data and an update time when the vector data was last updated. Thus dynamic tile provider server 120 facilitates access, including granting access rights, to an interface to allow access to a dynamic tile service via a network 105.

By way of example, the UE 101, services 110 and dynamic tile provider system 120 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages.

In the illustrated embodiment, the UE 101 includes a browser 107 and a client process 114, such as a client process for one or more of servers providing services 110 or a client process for dynamic tile provider server 120. The client process 114 receives a tile directly from dynamic tile provider server 120 or indirectly from one of the services 110, and renders the dynamic content in that tile at the UE 101.

Although processes are depicted in FIG. 1 as integral blocks in a particular arrangement for purposes of illustration, in other embodiments, one or more blocks or portions thereof are distributed differently on one or more devices connected to network 105.

Figure 2:
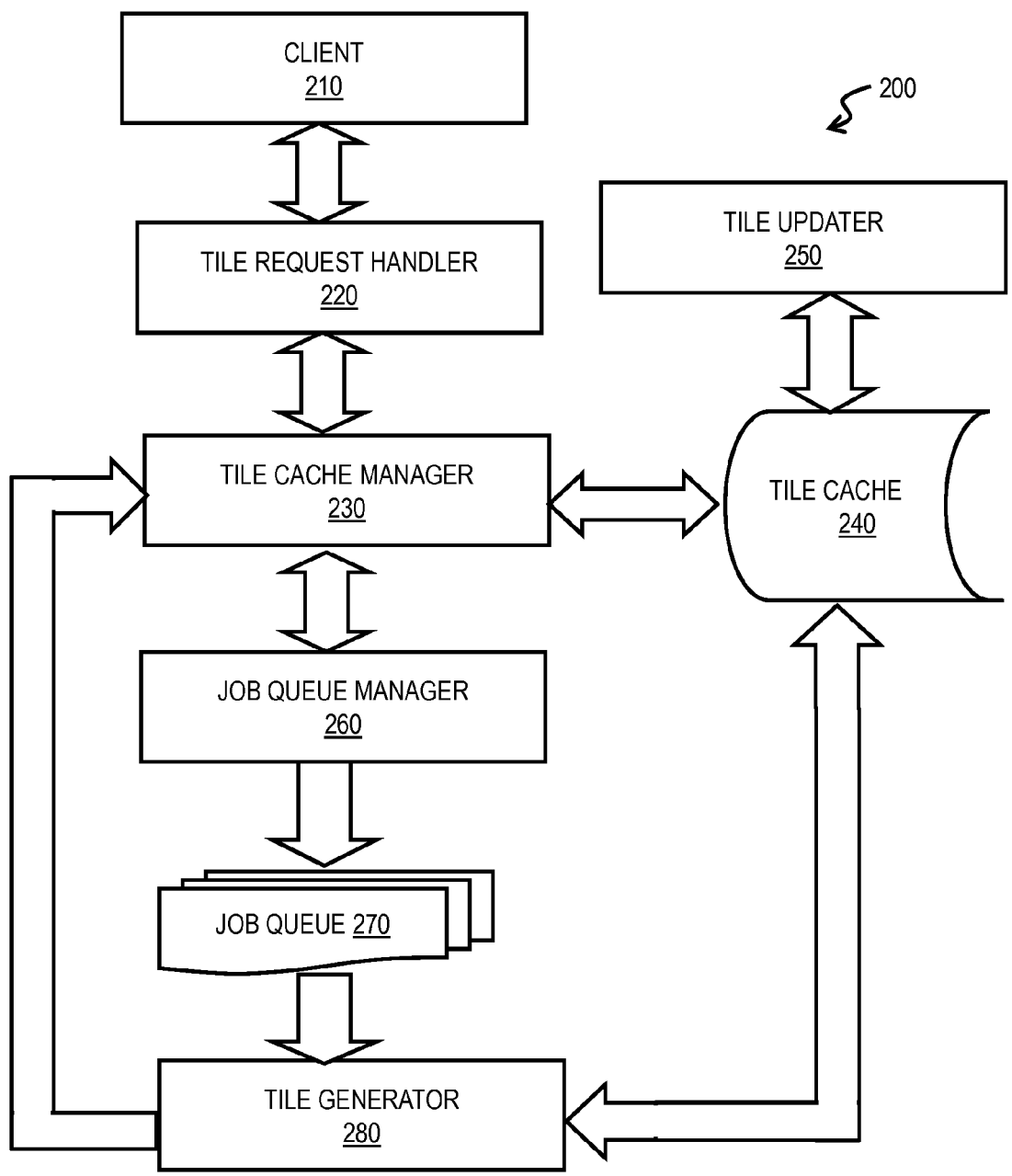
FIG. 2 is a diagram of the components of a dynamic tile provider service, according to one embodiment.

FIG. 2 is a diagram of the components of a dynamic tile provider service 200, according to one embodiment. By way of example, the dynamic tile provider service 200 includes one or more components for providing dynamic tiles. It is contemplated that the functions of these components may be combined in one or more components or performed by other components of equivalent functionality on one or more different devices in communication with a network, such as network 105. Service 200 includes a client process 210 such as browser 107 or client 114 on UE 101 or a browser or other client process within one or more of services 110.

In some traffic map embodiments, the client component is made up of a process executing on a user's mobile device. This process contains a feature for displaying maps on a screen of the user's device. As the user moves on a route or pans through the map display on the mobile device, the client computes the relevant tiles to issue in a request to the server. These are the tiles that are visible on the device display screen. The client composes a network request to the server to retrieve up-to-date traffic information for the tiles computed in the preceding step. When the client receives a tile from the server in response to the request, the client displays the bits for each pixel (called a bitmap) for traffic tile images (e.g., by overlaying the bitmap on pixels of base map tiles). If an estimated completion time is returned instead of a tile bitmap, the client re-issues a request for the tile based on the estimated completion time, as described in more detail below. This allows the client process to perform other actions and not wait idly for a long-delayed tile.

In some embodiments, the components of service 200 other than client 210 are included in dynamic tile provider server 120 depicted in FIG. 1. In this embodiment, the dynamic tile provider server 120 includes a tile request handler module 220, a tile cache manager module 230, a tile cache data structure 240, a tile updater module 250, a tile job queue manager 260, a job queue data structure 270, and a tile generator module 280.

The tile request handler module 220 receives and responds to tile requests from clients, such as traffic tile requests. The tile request handler module 220 forwards all client requests to the tile cache manager; and returns tiles or estimated completion times to the client 210.

The tile cache manager module 230 maintains a cache of generated traffic tiles and vector data associated with each tile. When the tile cache manager module 230 receives a request from the tile request handler 220, the tile cache manager module 230 looks up the tile in its tile cache data structure 240. If the tile does not exist in the cache data structure 240, then the tile cache manager module 230 forwards data based on the request to the job queue manager module 260. If the tile exists in the cache data structure 240, then the tile cache manager module 230 checks if an update time of vector data associated with the tile is later than the tile generation time. The update time is the time when the vector data was last updated, e.g., with new traffic information that implies that the traffic condition on some road segment in the tile has changed and a road segment color has changed. The tile generation time is the last time the tile was generated from vector data.

If the update time is later than the tile generation time, then the tile cache manager module 230 forwards the data indicating the tile request to the job queue manager module 260. The tile cache manager module 230 receives a request completion time estimate from the job queue manager module 260 which is forwarded to the tile request handler module 220 for response to the client 210. Otherwise the update time is before the tile generation time; and the tile cache manager module 230 returns the cached tile to the tile request handler module 220, because nothing has changed since the tile was last generated. This technique greatly improves performance by avoiding regeneration for unchanged tiles. The tile cache manager module 230 along with the update time and generation time in the tile cache data structure 240 is an example means to achieve this advantage.

The tile updater module 250 receives data indicating changes in content with time and updates the vector data for the affected tiles in the tile cache data structure 240 and indicates the time of the update. For example, tile updater module 250 receives data from a traffic service indicating congestion along a portion of a road, determines the tiles and road segments affected by that traffic report and the appropriate colors for the affected segments, and updates the values in the vector data and a time associated at least with the changed vector data. In some embodiments, the tile updater module 250 manages the data that indicate the state of traffic on road networks. When the traffic state changes on any road network on a given tile, it updates the tile update time in the vector data for that tile to the current time. In many embodiments, the tile updater module 250 operates as a parallel process independent of serving requests from client 210, e.g., on a different network node or processor.

Note that a tile is not generated automatically when the vector data is updated or on any time schedule in this embodiment. In the illustrated embodiments, a user request is involved, making tile generation an on-demand process. An advantage of this approach is that service equipment resources are not expended for generating tiles that are not requested by any consumer. The independent tile updater module 250 and vector data in tile cache data structure 240 and tile cache manager 230 are example means to achieve this advantage.

The job queue manager module 260 maintains a queue of pending requests to generate tiles from vector data, which is called the generation job queue data structure 270. When the job queue manager module 260 receives a request to generate a tile, it checks if a prior request is pending for this tile, that is, if an identical request already exists in the generation job queue data structure 270. In some embodiments, the generation job queue data structure 270 involves a hash table. This provides fast look up. Thus, the hash table is an example means of achieving fast look up of tiles already in a job queue. The job queue manager module 260 inserts the request in the job queue data structure in response to determining that the request does not already exist in the queue. This provides the advantage of avoiding duplicate generation of tiles after an update and conserves service equipment resources. The job queue manager module 260 and job queue data structure 270 are an example means of achieving this advantage. In some embodiments, the job queue manager module 260 then responds to the source of the request with a completion time estimate, as described in more detail below. This allows a requesting process to perform other tasks until the tile is generated, and makes better use of requester resources, such as in client process 210 or on UE 101. The computation and return of estimated completion time is an example means of achieving this advantage.

The tile generator module 280 processes the requests in the generation job queue data structure 270, e.g., on a first-come first-serve basis. After generating a tile based on vector data in the tile cache data structure 240, the tile generator sets the tile generation time for that tile to the current time (e.g., in the vector data associated with the tile) in tile cache data structure 240. The tile generator module 280 also removes the corresponding tile request from the job queue data structure, and sends the generated tile to the tile cache manager module 230 to insert into the tile cache data structure 240. In some embodiments, the tile generator 280 writes a file that comprises the tile directly into the tile cache data structure 240, and just sends the file name and location and generation time to the tile cache manager module 230, which stores that information into the vector data associated with the tile.

Figure 3A:
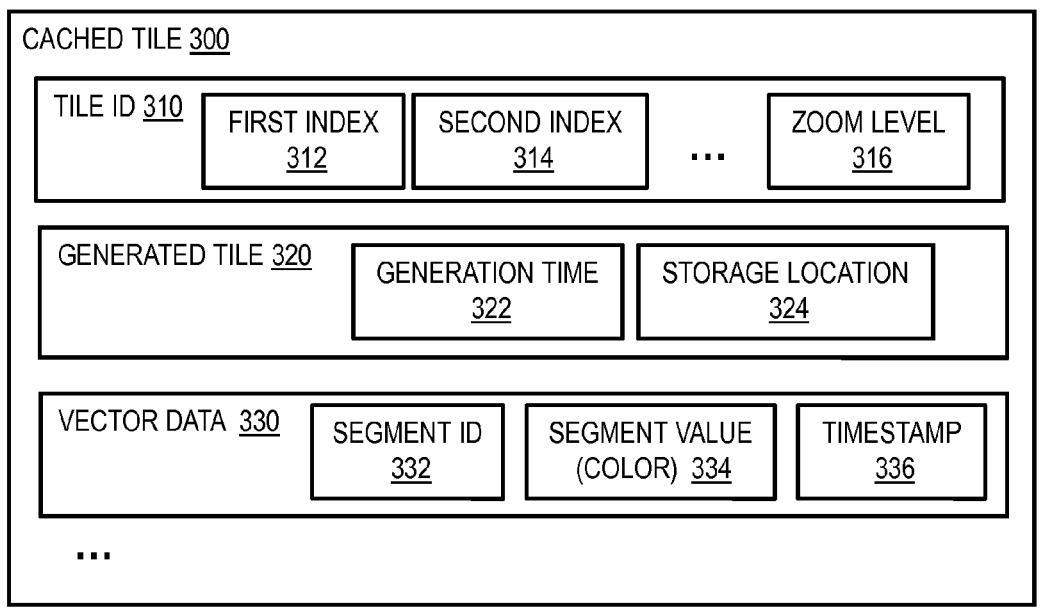
FIG. 3A is a diagram of a data structure for caching tiles with dynamic content, according to one embodiment.

FIG. 3A is a diagram of a data structure 300 for caching tiles with dynamic content, according to one embodiment. Cached tile data structure 300 represents one tile of a plurality of tiles in tile cache data structure 240, and includes a tile identifier (ID) field 310, a generated tile field 320 and one or more vector data fields 330.

The tile ID field 310 holds data that uniquely identifies a tile. In an illustrated embodiment for map or traffic tiles, the tiles comprise a two dimensional array of two-dimensional tiles at each of multiple scales (called zoom levels herein); and a tile is uniquely identified by a first index spanning all longitudes of interest, a second index spanning all latitudes of interest, and a zoom level with different amounts of detail at different zoom levels. In such embodiments, a tile ID field 310 includes a first index field 312 holding data that indicates a value for the first index, a second index field 314 holding data that indicates a value for the second index, and a zoom field 316 holding data that indicates a value for the zoom level. In other embodiments, more indices, indicated by the ellipsis, or fewer indices are used to identify the tile.

The generated tile field 320 holds data that indicates the generated tile, such as the pixel bitmap or a pointer to a memory location where the tile is stored. In the illustrated embodiment, the generated tile field 320 includes a generation time field 322 and a storage location field 324. The generation time field 322 holds data that indicates the generation time when the particular tile of dynamic content was most recently generated based on particular vector data associated with the particular tile of cached tile data structure 300. The storage location field 324 holds data that indicates the memory or storage device location where the generated tile is stored, e.g., as bitmap of pixels for the map and traffic image.

The vector data field 330 holds data that indicates at least some vector data used to generate a tile suitable for rendering on a consumer's device, such as UE 101. In some embodiments, the cached tile data structure 200 includes additional vector data fields indicated by ellipsis following field 330. In the illustrated embodiment, vector data field 330 includes a segment identifier (ID) field 332, a segment value field 334 and a timestamp field 336.

The segment ID field 332 holds data that indicates a portion of the tile generated by the vector data, such as a road segment on a road map or traffic map. Any method known in the art may be used to indicate the segment, such as a set of two or more pairs of coordinates defining one or more line segments along a path representing a portion of a road on a road map. The segment value field 334 holds data that indicates a value for the portion of the tile, such as a color that indicates traffic conditions (e.g., black for no traffic information, green for traffic flowing at posted speeds, yellow for traffic flowing below posted speeds, and red for stop and go traffic). The timestamp field 336 holds data that indicates a time when the vector data was last updated, e.g., a time when the segment value in field 334 changed from one color to a different color. In some embodiments, there is a timestamp field 336 for each vector data field 330. In some embodiments, there is one timestamp field, and it is used any time any of the vector fields 330 and ellipsis is updated.

Thus cached tile data structure 300 is an example data structure configured for an apparatus to provide a tile of dynamic content. The data structure 300 comprises, in field 320, data that indicates a tile suitable for rendering on user equipment, and, in field 330 vector data suitable for generating the tile. The data structure 300 includes, in field 322, a generation time, wherein the generation time is a time when the tile of dynamic content was most recently generated based on the vector data. The data structure 300 includes, in field 336, an update time, wherein the update time is a time when the vector data was most recently updated. Thus cached tile data structure 300 is an example means for achieving the advantage of saving resources on the service equipment by only generating a tile when it is requested after an update to vector data that is received later than the last time the tile was generated.

Figure 3B:
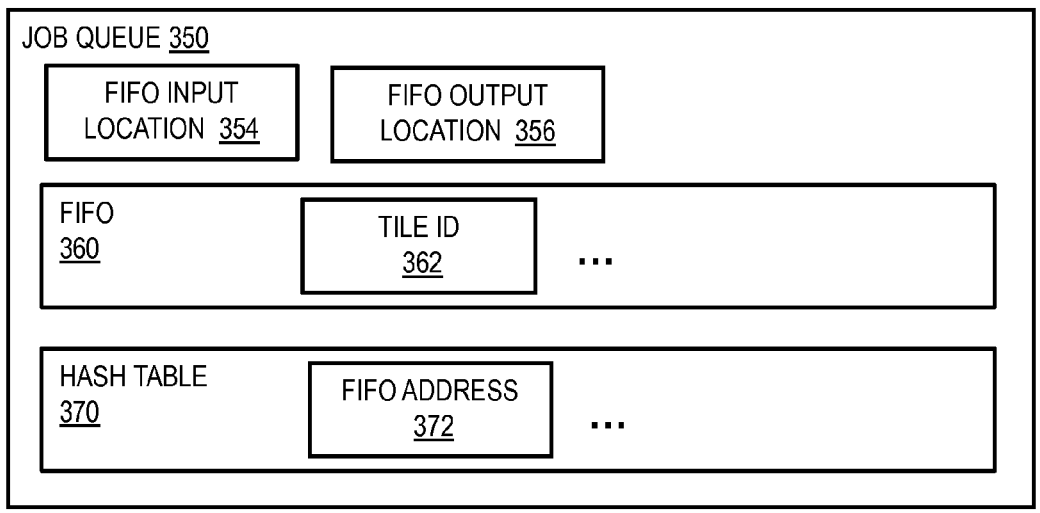
FIG. 3B is a diagram of a job queue for generating tiles with dynamic content, according to one embodiment.

FIG. 3B is a diagram of a job queue 350 for generating tiles with dynamic content, according to one embodiment. Job queue data structure 350 is an example embodiment of the generation job queue data structure 270 depicted in FIG. 2, which uses a first-in, first-out (FIFO) data structure, well known in the art, to store a list of tiles to be generated. The job queue 350 includes a FIFO input location field 354, a FIFO output location field 356 and a FIFO data structure 360 with one tile ID for each tile to be generated as indicated by tile ID field 362 and ellipsis. In some embodiments, the job queue data structure 350 also includes a hash table 370.

The FIFO input location field 354 holds data that indicates a location in the FIFO data structure 360 where the newest tile is to be added to the queue. The FIFO output location field 356 holds data that indicates a location in the FIFO data structure 360 where a tile ID of the next tile to be generated is retrieved from the FIFO data structure. The difference between the locations in fields 354 and 356 is related to the number of tiles in the job queue. Field 354 is incremented every time a tile ID is added to the FIFO data structure 360 by the job queue manager module 260. Field 356 is incremented every time a tile is generated by the tile generator module 280. When the maximum location for the FIFO is incremented, the next value is the first location in the FIFO. A difference between the FIFO address of a tile and the FIFO output location field 356 indicates in what order the tile is scheduled to be generated; and an estimated time can be computed based on the FIFO address difference and an average time to generate a tile. As described above, an estimated time allows a client process to execute other instructions rather than wait idly for a tile, and thus make more efficient use of resources on the client device, such as UE 101. An example means of achieving this advantage of not wasting client resources is an estimated time based on a difference of locations in the FIFO indicated by fields 354 and field 356.

In some embodiments, the size of the FIFO is limited so that an excessive number of tile generation jobs that might overwhelm the resources of the service equipment is avoided. This offers an advantage of avoiding overloading service equipment; and an example means of achieving this advantage is to use a FIFO of limited size.

The hash table 370 is used in embodiments to speed the determination whether a tile is already in the job queue. The entries in the hash table 370 include a FIFO address field for every tile as indicated by FIFO address field 372 and ellipsis. A tile ID value, such as an ID including a file name, first and second indices and zoom level is input to a hash function that outputs a single integer that is likely to be different for each tile ID. The integer is used as a pointer into the hash table where is stored in field 372 the location of the tile ID in the FIFO data structure 360. The value in the FIFO address field 372 is set to a null value, e.g., zero, when a tile is not in the FIFO data structure 360. Thus, the hash table is an example means of achieving the advantage of quickly determining whether a tile ID is in the job queue, without searching every entry in the FIFO 360. In some embodiments, in which the hash output value is not necessarily unique for each different tile ID, the tile ID is included in the hash table in association with the FIFO address field, to distinguish several tile IDs with the same hash output value.

When a tile with a particular ID is requested, the tile ID is input to the hash function which outputs an integer that indicates a particular FIFO address field 372 in the hash table 370. If the FIFO address is not null, then the tile is already in the FIFO and, to avoid duplication of effort, is not added again to the FIFO data structure 360. If the FIFO address is null, then the tile is not already in the FIFO and is added at a location of the FIFO data structure 360 indicated by data in the FIFO input location field 354. The value in field 354 is input to the FIFO address field 372 in the corresponding position in the hash table 370. After the tile ID is added to the FIFO 360, the value in the FIFO input location field 354 is incremented. When a tile indicated by a tile ID in FIFO 360 at a location indicated by data in field 356 is generated, the corresponding entry in the hash table 370 is set to a null value, and the value in the FIFO output location field 356 is incremented.

Although data structures and fields are shown in FIG. 2 and FIG. 3A and FIG. 3B as integral blocks in a particular order for purposes of illustration, in other embodiments, one or more data structures or fields, or portions thereof, are arranged in a different order or in one or more database in one or more memory or storage devices on one or more nodes of a network, such as network 105.

Figure 4A:
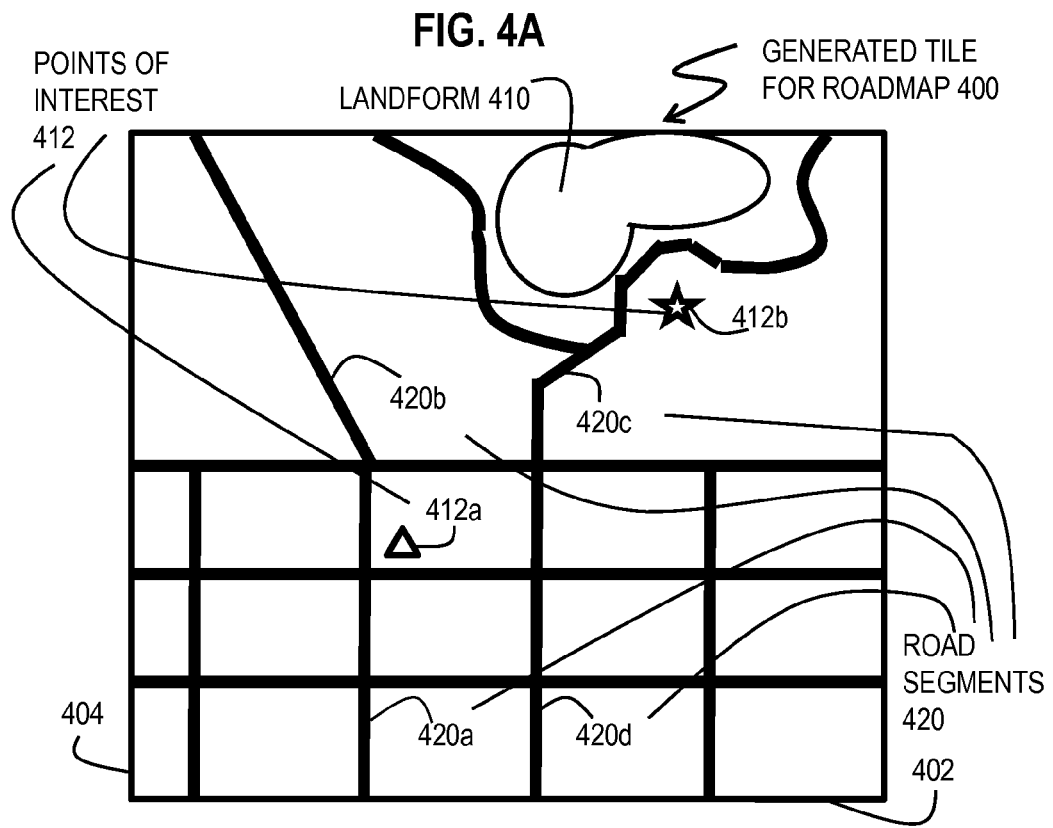
FIG. 4A is a diagram of a roadmap tile with dynamic content at one time, according to an embodiment.

FIG. 4A is a diagram of a roadmap tile 400 with dynamic content at one time, according to an embodiment. The generated tile of pixels representing a roadmap is suitable for rendering on user equipment, e.g., UE 101. The generated tile 400 includes rows of pixels arranged in a horizontal dimension 402 and columns arranged in a vertical dimension 404. The pixels represent map information, such as landform 410 (e.g., a lake or park), and one or more points of interest 413*a* and 412*b*, collectively referenced hereinafter as pointes of interest 412, such as a bank or theater. The tile 400 also includes pixels representing road segment 420*a*, road segment 420*b*, road segment 420*c* and road segment 420*d*, among others, collectively called road segments 420 hereinafter. For purposes of illustration, it is assumed that this tile is identified by two indices and a zoom level with triplet values (111, 222, 5). It is further assumed that no traffic information is available, and all road segments 420 are black in color.

Figure 4B:
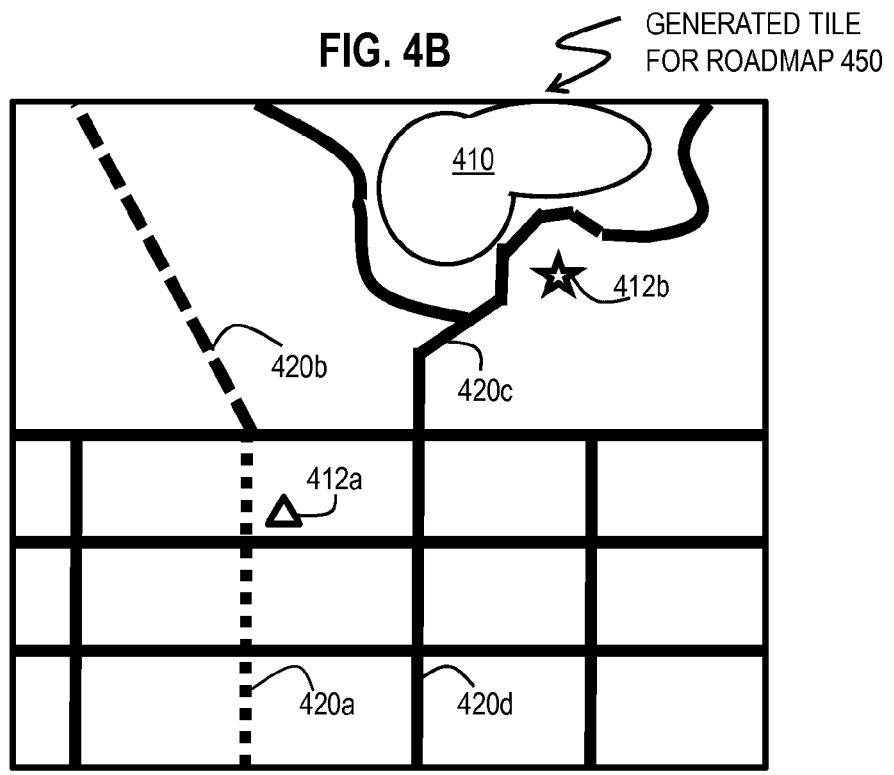
FIG. 4B is a diagram of a roadmap tile with different dynamic content at a different time, according to an embodiment.

FIG. 4B is a diagram of a roadmap tile 450 with different dynamic content at a different time, according to an embodiment. Horizontal dimension 402, vertical dimension 404, landform 410 and points of interest 412, are as described above. It is assumed for purposes of illustration that traffic information has become available that indicates road segment 420*b* is congested with stop and go traffic to be represented by the color red (dashed line), and that road segment 420*a* is presenting traffic below posted speeds to be represented by the color yellow (dotted lines), and the rest are at posted speeds represented by the color green (solid lines). This information is placed into vector data 330 associated with the tile (111, 222, 5). If at least one consumer requests this tile, e.g., a request is received from client 114 on UE 101, then the new tile 450 is generated and eventually returned to a client, such as client 114, which renders the tile, e.g., on a display screen of UE 101.

Figure 7:
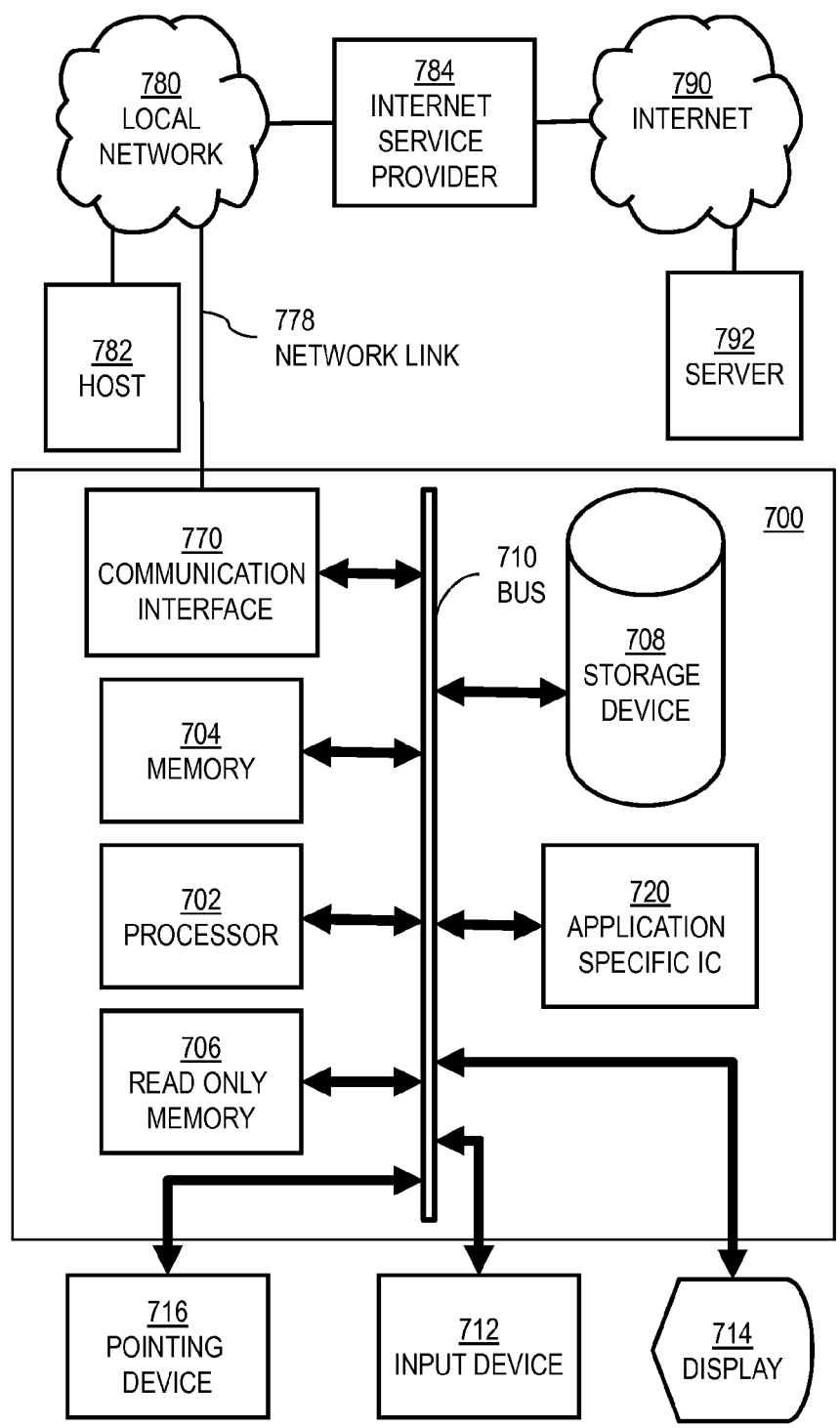
FIG. 7 is a diagram of hardware that can be used to implement an embodiment of the invention.
Figure 8:
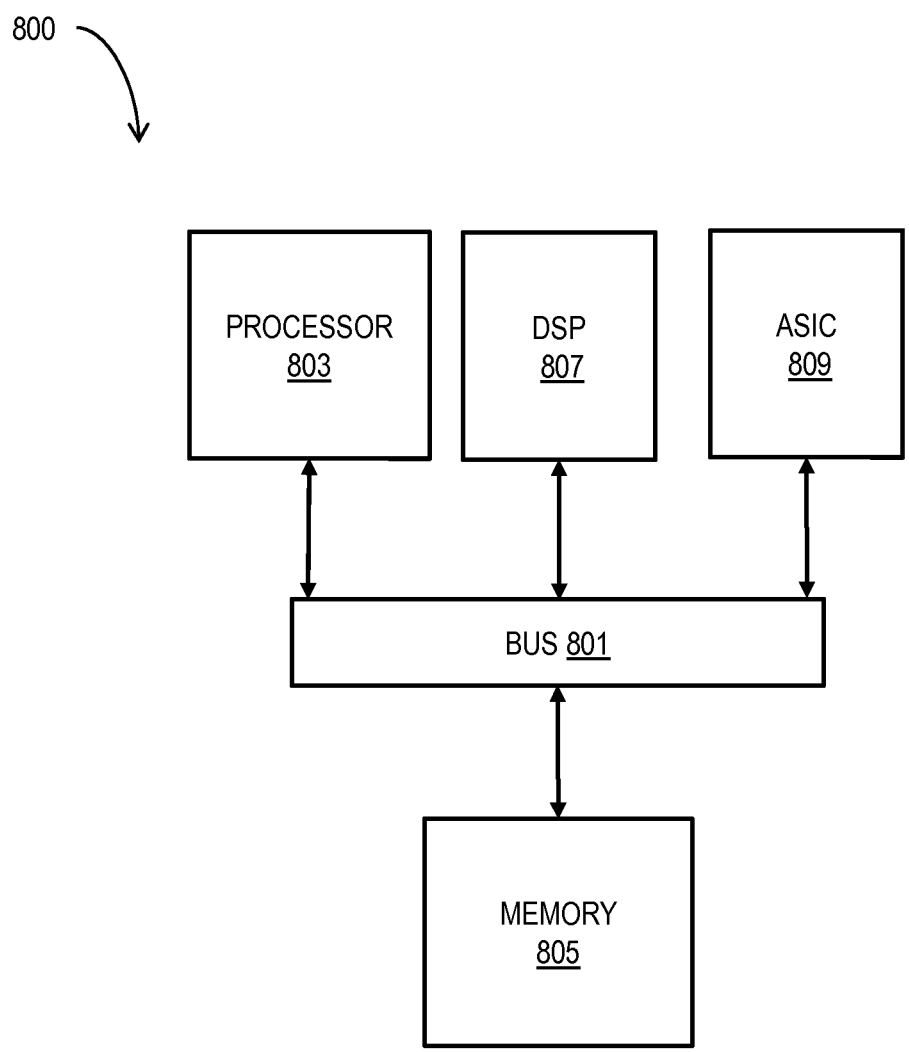
FIG. 8 is a diagram of a chip set that can be used to implement an embodiment of the invention.

FIG. 5 is a flowchart of a process 500 for a dynamic tile service, according to one embodiment. In one embodiment, the dynamic tile provider server 120 performs the process 500 and is implemented in, for instance, a chip set including a processor and a memory as shown FIG. 8, or on one or more general purpose computers as shown in FIG. 7. In some embodiments, steps 501 through 507 constitute step 501 performed by a tile updater module 250, as implemented, for example in a chip set depicted in FIG. 8 a general purpose computer as depicted in FIG. 7. In some embodiments, steps 511 through 519 constitute step 510 performed by a tile request handler module 220, as implemented, for example in the same or different chip set, as depicted in FIG. 8, or the same or different general purpose computer, as depicted in FIG. 7. In some embodiments, steps 521 through 529 constitute step 520 performed by a tile cache manager module 230, as implemented, for example in the same or different chip set, as depicted in FIG. 8, or the same or different general purpose computer, as depicted in FIG. 7. In some embodiments, steps 531 through 535 constitute step 530 performed by a tile job queue manager module 260, as implemented, for example in the same or different chip set, as depicted in FIG. 8, or the same or different general purpose computer, as depicted in FIG. 7. In some embodiments, steps 541 through 543 constitute step 540 performed by a tile generator module 280, as implemented, for example in the same or different chip set, as depicted in FIG. 8, or the same or different general purpose computer, as depicted in FIG. 7

Although steps are shown in FIG. 5, and in subsequent flow chart FIG. 6, as integral blocks in a particular order for purposes of illustration, in other embodiments, one or more steps or portions thereof are performed in a different order or overlapping in time, performed in series or in parallel, or one or more steps are omitted, or other steps are added, or the method is changed in some combination of ways.

In step 501, a cache of tiles of dynamic content is maintained on one or more computer-readable storage media, as described in more detail below with reference to FIG. 7. For example, tile cache data structure 240 is created and maintained in one or more data bases on one or more storage devices. For purposes of illustration, it is assumed that cached tile data structure 300 holds data that indicates the tile of FIG. 4A within tile cache 240.

In step 505, it is determined whether an update is received for one or more fields of vector data used to generate one or more tiles. If not, control passes to step 510, described below. If so, control passes to step 507, described next. For example, it is determined that traffic data is received for tile (111, 222, 5) for road segment 420*a* and road segment 420 indicating below limit speeds, and stop and go traffic conditions, respectively; and control passes to step 507.

In step 507, the update is stored in association with the tile. For example, the color of below limit speed, yellow, is stored in vector data 330 associated with the tile (111, 222, 5) indicated in tile ID field 310, and the color of stop and go traffic, red, is stored in vector data indicated by ellipsis associated with the same tile (111, 222, 5). Control then passes back to step 505 to determine if other vector data updates are received.

If it is determined, in step 505, that vector update data is not received, then in step 511, it is determined, e.g., by tile request handler module 220, whether a request for a tile is received from a client, e.g., from client 114 on UE 101 or from a similar process within one of services 110. If not, then in step 513 it is determined whether conditions are satisfied to end the tile providing process. If so, the process ends. Otherwise, control passes back to step 505 to determine whether an update is received for any of the tiles.

If it is determined, in step 511, that a request is received for a tile, then the request is passed to the tile cache manager module 230, which determines, in step 521, whether the requested tile is for a generated tile already in the cache. For example, in some embodiments, a tile is not generated until a first consumer requests that tile, and only the vector data associated with that tile is in the cached tile data structure 300 of the tile cache data structure 240. If the requested tile is for a tile not yet generated, and therefore without a generated tile in the cache, then control passes to the job queue manager module 260 to perform step 530 to place an appropriate job in the queue, as described in more detail below. For example, if generation time field 322 indicates a null value or if the storage location field 324 holds a null value, then it is determined in step 521 that the generated tile is not already in tile cache 240. For purposes of illustration, it is assumed that tile 400 is already generated and stored in tile cache 240.

If it is determined, in step 521, that the requested tile is for a generated tile already in the cache, then in step 523 it is determined whether the tile was generated after the most recent update. For example, it is determined whether the time indicated in the generation time field 322 is after the latest time in any timestamp field 336 of any vector data field 330 associated with the tile. If so, then the generated tile in cache can be used and does not need to be generated again from vector data. In step 529, the generated tile in tile cache 240 is retrieved and passed to the request handler module 220. In step 519, the request handler module 220 returns the generated tile to the client that sent the request.

Thus, the dynamic tile provider server 120, in response to receiving a request for a particular tile of dynamic content, determines a generation time and an update time. The generation time is a time when the particular tile of dynamic content was most recently generated based on particular vector data associated with the particular tile. The update time is a time when the particular vector data was most recently updated. The dynamic tile provider server 120 further determines whether the generation time is later than the update time. The dynamic tile provider server 120 further retrieves the particular tile from cache without causing the particular tile to be generated based on the particular vector data, if the generation time is later than the update time. The dynamic tile provider server 120 returns the particular tile of dynamic content via the network.

If it is determined in step 523 that the generated tile in cache was not generated after the update time, then control passes step 530 to generate the tile performed by the job queue manager module 260. Thus the dynamic tile provider server 120 causes the particular tile to be generated based on the particular vector data in response to determining that the generation time is not later than the update time. For purposes of illustration, it is assumed that roadmap tile 400 was not generated after the traffic vector data was updated indicating a red road segment 420*b* and a yellow road segment 420*a*.

In step 531 a non-redundant job is inserted into the tile generation job queue 270. To avoid redundant generation, step 531 includes determining whether data indicating the particular tile (e.g., tile ID 111, 222, 5) is already included in a queue that indicates any tiles to be generated from associated vector data. If data indicating the particular tile is not already included in the queue, then data indicating the particular tile is caused to be added to the queue. If data indicating the particular tile is already included in the queue, then data indicating the tile is caused not to be added the queue.

For example, the tile ID (roadmap, 111, 222, 5) is input to the hash function, and the hashed value is used in the hash table 370 to determine data in a FIFO address field 372. If the FIFO address field 372 holds a valid, non-null value, then the job queue already includes the requested tile and no further data is added to the job queue 270. The value in the FIFO address field 372 indicates the current position of the requested tile in the job queue and is used to estimate a completion time, as described in more detail below with reference to step 533.

If the FIFO address field 372 holds a null value, the requested tile is not already in the job queue; so the requested tile is added to the job queue 270. In an illustrated embodiment, the requested tile is added to the job queue by determining the value indicated by data in the FIFO input location field 354, using that value as the current position of the requested tile, storing the tile ID for the requested tile in the tile ID field 362 at the current position in FIFO 360, and increment the value indicated in the FIFO input location field 354.

Thus, in some embodiments, causing the particular tile to be generated based on the particular vector data further comprises determining whether data indicating the particular tile is already included in a queue that indicates any tiles to be generated from associated vector data. If data indicating the particular tile is not already included in the queue, then causing data indicating the particular tile to be added to the queue. If data indicating the particular tile is already included in the queue, then causing data not to be added the queue. For purposes of illustration, it is assumed that tile (roadmap, 111, 222, 5) is already in the queue a FIFO location 77.

In step 533, a completion time is estimated. The order of the requested tile generation is determined by determining the difference between the FIFO output location indicated in field 356 and the current position of the requested tile. For example, if the FIFO output location is at position 37 and the current position of the requested tile is 77, then the difference D is 40 positions. If G is the generation time in milliseconds for one tile, then the estimated generation time is about G*D, such as G*(D+1) to account for the time to generate the first tile, or about 41 G. If G is 10 milliseconds, then the estimated completion time is 410 milliseconds. Thus, the dynamic tile provider server 120 determines an estimated time to complete generation of the particular tile, based on position in the queue of data indicating the particular tile.

In some embodiments, the tiles are determined to take vastly differing times to generate (for example, tiles with vector data of varying sizes). In some of these embodiments, estimating request completion time for a new tile job includes maintaining a global variable T for the job queue that indicates the total estimated completion time for all jobs in the queue. When a new tile job J is added to the job queue, then the request completion time for J is T+u where u is a particular estimated time to generate J based on data particular to tile J, and the global time variable T is updated to T=T+u. When the generation of a tile job J is completed, the global time variable T is updated to T=T−u where u was the estimated generation time for J.

In step 535, the estimated completion time is returned to the client. For example, the estimated time is passed to the tile cache manager module 230, which returns the estimated completion time to the tile request handler module 220, which returns the estimated completion time to the client 210. Thus, the dynamic tile provider server 120 causes the estimated time to be returned via the network. This bestows the advantage of allowing the client to perform other useful actions rather than wait idly for the tile to be generated. The estimated completion time is an example means to achieve this advantage.

In step 540, the tile generator module 280 generates a tile from vector data and returns it to the tile cache manager module 230 to store in the tile cache data structure 240. In step 541, the tile is generated from the vector data. For example, the value indicated by data in the FIFO output location field 356 is used to read the FIFO field 360 and retrieve the tile ID field 362 at that position. The tile ID indicated in the field 362 is used to retrieve the vector data 330 and ellipsis associated with the tile. The tile is generated so it is suitable for rendering on a consumer's device, e.g., UE 101. The generation time is determined, e.g., by requesting the current time from a system clock; and, the value indicated in the FIFO output location field 356 is incremented to indicate that the tile has been generated. Thus, the tile is caused to be generated based on the vector data if the update time is later than the previous generation time.

In step 543, the generated tile is stored in association with the tile. In some embodiments the tile is stored in a storage location in the tile cache data structure 240 and the storage location and generation time are returned. The tile cache manager module 230 stores data indicating the generation time in field 322 and data indicating the location of the generated tile in storage location field 324. In some embodiments, the generated tile is also returned to the tile cache manager module 230, which stores the generated tile in cache, either in field 320 or in a storage location pointed to by data in storage location field 324. In some embodiments, the tile generator module 280 stores the generation time in the generation time field 322. Control then returns to step 529, described above. Thus, the dynamic tile provider server 120 stores the particular tile into cache; and sets the generation time associated with the particular tile to a value that indicates when the particular tile was generated.

Figure 9:
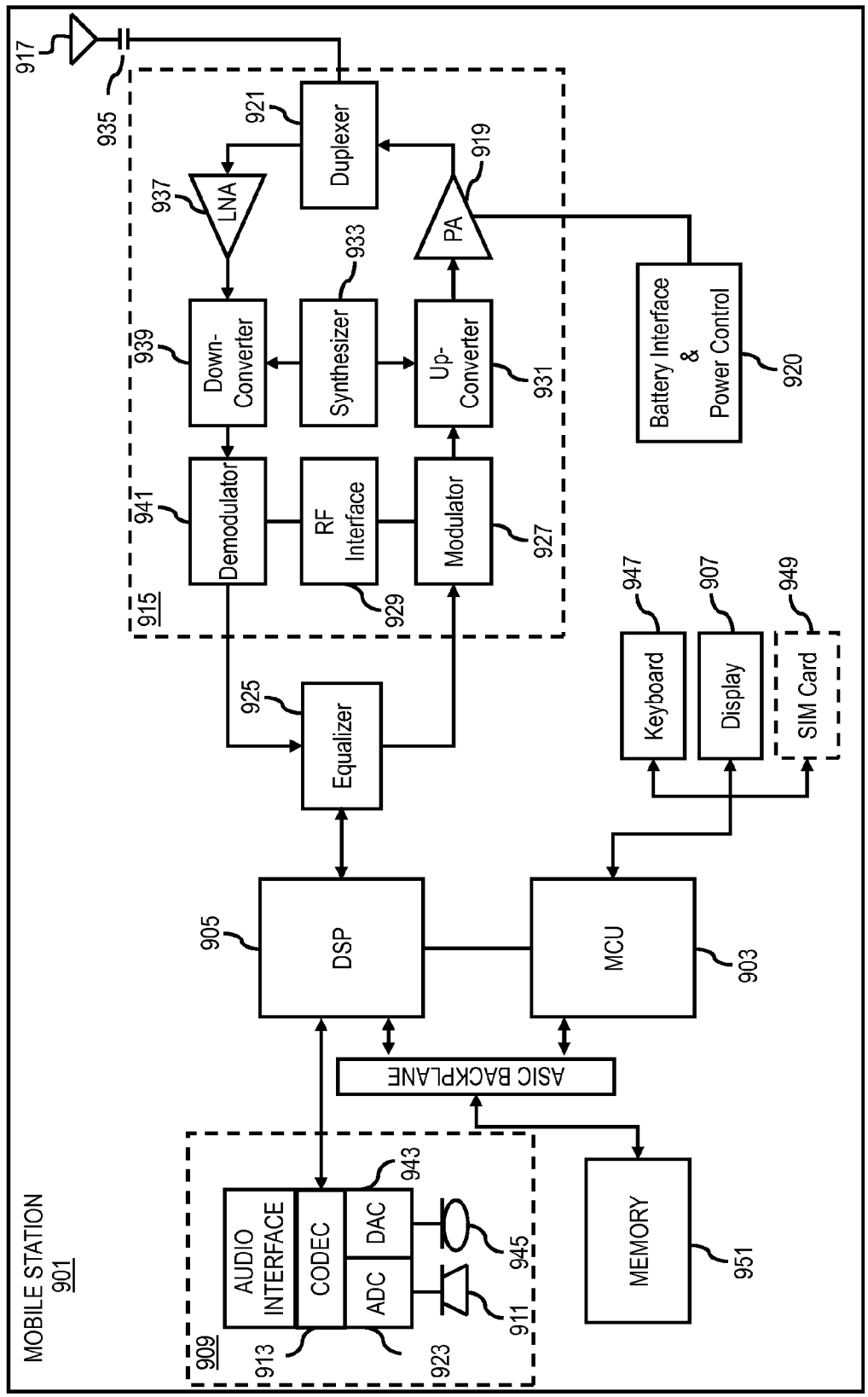
FIG. 9 is a diagram of a mobile terminal (e.g., handset) that can be used to implement an embodiment of the invention.

FIG. 6 is a flowchart of a process 600 for a dynamic tile client, according to one embodiment. In one embodiment, the client 114 performs the process 600 and is implemented in, for instance, a chip set including a processor and a memory as shown FIG. 8, e.g., on a mobile terminal as shown in FIG. 9. In one embodiment, a service 110 performs the process 600 and is implemented in, for instance, a general purpose computer as shown FIG. 7.

In step 601, it is determined to request a tile of dynamic content, e.g., it is determined to request traffic information for roadmap tiles surrounding a vicinity of a consumer in a navigation system on a mobile telephone. In step 603, a request is sent to dynamic tile provider server 120 for a generated tile suitable for rendering on the consumer's device, e.g., suitable for rendering on UE 101.

In step 605, it is determined whether the generated tile is received. If so, then the generated tile is used in step 607, e.g., sent to or rendered on the consumer's device, e.g., UE 101, or used to reroute the consumer's driving directions. In step 609, it is determined whether conditions are satisfied for an ending the process, e.g., a command is received to stop the process. If so, then the process ends. If not, then control passes back to step 601.

If it is determined in step 605 that a generated tile is not received, then in step 611, it is determined whether an estimated completion time is received. If not, control passes back to step 609, described above to determine if end conditions are satisfied.

If it is determined in step 605 that an estimated completion time is received, then in step 613 one or more other functions or operations are performed. In various embodiments, the operation is independent of causing a request to be sent for a generated tile and determining whether a response is received to the request.

In step 615, it is determined whether the estimated completion time has expired. If not, then control passes back to step 613 to perform other functions or operations. If so, then control passes back to step 603 to request the generated tile again. The response to this repeated request is likely to be the generated tile and not another estimated time.

Thus, in some embodiments, in response to causing a first request for a particular tile of dynamic content to be sent, a client process receives data that indicates an estimated time to complete generation of the particular tile. The client process causes a second request for the particular tile to be sent at a time based at least in part on the estimated time. Furthermore, an operation is caused to be performed during a time interval between receiving the data that indicates the estimated time and causing the second request to be sent. In some embodiments, the operation is independent of causing the first request to be sent and causing the second request to be sent and determining whether a response is received to the first request or the second request. Step 611 is an example means to achieve the advantage of not wasting resources on the device of the client process, such as UE 101, by not waiting idly for a generated tile that is not yet ready from the dynamic tile provider service 120.

The illustrated embodiments provide a highly scalable technique for providing dynamic traffic tiles in a high-demand environment. The use of generation job queues ensures that a given tile is not concurrently generated by multiple processes—hence ensuring good use of available computer resources. Placing a limit on the job queue capacity also allows the server to control the load on the system—preventing server crashes due to overrun of available computer resources. The introduction of request completion time estimates ensures that network resources are not wasted in having clients wait for requests to be completed. It also improves performance, responsiveness and concurrency on the client-side, because the client application can undertake other tasks while its request is being handled by the server. Furthermore, these techniques can be applied to the retrieval of any type of dynamic content from a server: files, web pages, images etc. The combined use of caching, job request queues and request completion estimates allows both server and client to operate as efficiently as possible in a high-demand environment.

The processes described herein for providing tiles of dynamic content may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide tiles of dynamic content as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing dynamic tiles A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to providing dynamic tiles. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing dynamic tiles. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing tiles of dynamic content, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing tiles of dynamic content to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

A computer program product includes one or more sequences of one or more instructions which, when executed by one or more processors, cause an apparatus to at least perform the steps of a method.

FIG. 8 illustrates a chip set 800 upon which an embodiment of the invention may be implemented. Chip set 800 is programmed to provide tiles of dynamic content as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of providing dynamic tiles.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide dynamic tiles The memory 805 also stores the data associated with or generated by the execution of the inventive steps.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of providing dynamic tiles. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing dynamic tiles. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide dynamic tiles. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating access, including granting access rights, to an interface to allow access to a service via a network, the service configured to:
   in response to receiving a request for a particular tile of dynamic content, determine a generation time, wherein the generation time is a time when the particular tile of dynamic content was most recently generated based on particular vector data associated with the particular tile;
   determine an update time, wherein the update time is a time when the particular vector data was most recently updated;
   determine whether the generation time is later than the update time; and
   cause the particular tile to be generated based on the particular vector data in response to determining that the generation time is not later than the update time, by determining whether data indicating the particular tile is already included in a queue that indicates any tiles to be generated from associated vector data if data indicating the particular tile is not already included in the queue, then cause data indicating the particular tile to be added to the queue; and if data indicating the particular tile is already included in the queue, then cause data not to be added the queue; and
   the method further comprises returning the particular tile of dynamic content via the network.

2. A method of claim 1, the service further configured to retrieve the particular tile from cache without causing the particular tile to be generated based on the particular vector data, if the generation time is later than the update time.

3. A method of claim 1, wherein to cause the particular tile to be generated further comprises to:
   store the particular tile into cache; and
   set the generation time associated with the particular tile to a value that indicates when the particular tile was generated.

4. A method of claim 1, wherein to generate the particular tile based on the particular vector data further comprises to:
   determine, based on position in the queue of data indicating the particular tile, an estimated time to complete generation of the particular tile; and
   cause the estimated time to be returned via the network.

5. A method of claim 1, wherein the particular tile comprises pixels for a two dimensional portion of a road map.

6. A method of claim 5, wherein the particular vector data comprises one or more members of a group comprising: time variable data that indicates colors associated with traffic congestion for road segments within the particular tile; time-variable data that indicates locations of one or more persons who satisfy first criteria; and time variable data that indicates locations of one or more establishments that satisfy second criteria.

7. A method of claim 1, wherein the particular tile comprises a portion of a web page.

8. A method of claim 7, wherein the particular vector data comprises time variable data for the portion of the web page at a certain time.

9. A method of claim 1, wherein the particular tile comprises a portion of a sound track or video stream.

10. A method of claim 9, wherein the particular vector data comprises one or more members of a group comprising: data that indicates time-variable text to be converted to speech; time-variable data that indicates intensity level for each of one or more wavelength bands; time-variable data that indicates amplification level for each of one or more wavelength bands; and time-variable data that indicates expansion level for one or more time or distance bands.

11. A method comprising:
in response to causing a first request for a particular tile of dynamic content to be sent, receiving data that indicates an estimated time to complete generation of the particular tile; and
causing a second request for the particular tile to be sent at a time based at least in part on the estimated time.

12. A method of claim 11, further comprising causing an operation to be performed during a time interval between receiving the data that indicates the estimated time and causing the second request to be sent, wherein the operation is independent of causing the first request to be sent and causing the second request to be sent and determining whether a response is received to the first request or the second request.

13. An apparatus comprising:
at least one processor; and
at least one memory including computer program code, the at least one memory and the computer program code configured to, with the at least one processor, cause the apparatus to perform at least the following,
in response to receiving a request for a particular tile of dynamic content, determine a generation time, wherein the generation time is a time when the particular tile of dynamic content was most recently generated based on particular vector data associated with the particular tile;
determine an update time, wherein the update time is a time when the particular vector data was most recently updated;
determine whether the generation time is later than the update time;
cause the particular tile to be generated based on the particular vector data in response to determining that the generation time is not later than the update time; and
cause the particular tile of dynamic content to be returned;
wherein causing the particular tile to be generated based on the particular vector data further comprises:
determining whether data indicating the particular tile is already included in a queue that indicates any tiles to be generated from associated vector data;
if data indicating the particular tile is not already included in the queue, then causing data indicating the particular tile to be added to the queue; and
if data indicating the particular tile is already included in the queue, then causing data not to be added the queue.

14. An apparatus of claim 13, wherein the apparatus is further caused, at least in part, to retrieve the particular tile from cache without causing the particular tile to be generated based on the particular vector data, if the generation time is later than the update time.

15. An apparatus of claim 13, wherein causing the particular tile to be generated further comprises:
storing the particular tile into cache; and
setting the generation time associated with the particular tile to a value that indicates when the particular tile was generated.

16. An apparatus of claim 13, wherein generating the particular tile based on the particular vector data further comprises:

determining, based on position in the queue of data indicating the particular tile, an estimated time to complete generation of the particular tile; and
causing the estimated time to be returned.

17. An apparatus comprising:
at least one processor; and
at least one memory including computer program code, the at least one memory and the computer program code configured to, with the at least one processor, cause the apparatus to perform at least the following,
in response to causing a first request for a particular tile of dynamic content to be sent, receive data that indicates an estimated time to complete generation of the particular tile; and
cause a second request for the particular tile to be sent at a time based at least in part on the estimated time.

18. An apparatus of claim 17, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

19. A method comprising facilitating access, including granting access rights, to an interface to allow access to a service via a network, the service configured to:
in response to receiving a request for a particular tile of dynamic content, determine a generation time, wherein the generation time is a time when the particular tile of dynamic content was most recently generated based on particular vector data associated with the particular tile;
determine an update time, wherein the update time is a time when the particular vector data was most recently updated;
determine whether the generation time is later than the update time; and
cause the particular tile to be generated based on the particular vector data in response to determining that the generation time is not later than the update time; and
the method further comprises returning the particular tile of dynamic content via the network;
wherein the particular tile comprises a portion of a web page and the particular vector data comprises time variable data for the portion of the web page at a certain time.

20. A method of claim 19, the service further configured to retrieve the particular tile from cache without causing the particular tile to be generated based on the particular vector data, if the generation time is later than the update time.

21. A method of claim 19, wherein to cause the particular tile to be generated further comprises to:
store the particular tile into cache; and
set the generation time associated with the particular tile to a value that indicates when the particular tile was generated.

22. A method of claim 19, wherein to cause the particular tile to be generated based on the particular vector data further comprises to:
determine whether data indicating the particular tile is already included in a queue that indicates any tiles to be generated from associated vector data;
if data indicating the particular tile is not already included in the queue, then cause data indicating the particular tile to be added to the queue; and if data indicating the particular tile is already included in the queue, then cause data not to be added the queue.

23. A method of claim 22, wherein to generate the particular tile based on the particular vector data further comprises to:
determine, based on position in the queue of data indicating the particular tile, an estimated time to complete generation of the particular tile; and
cause the estimated time to be returned via the network.

24. A method of claim 19, wherein the particular tile comprises pixels for a two dimensional portion of a road map.

25. A method of claim 24, wherein the particular vector data comprises one or more members of a group comprising: time variable data that indicates colors associated with traffic congestion for road segments within the particular tile; time-variable data that indicates locations of one or more persons who satisfy first criteria; and time variable data that indicates locations of one or more establishments that satisfy second criteria.

26. A method of claim 19, wherein the particular tile comprises a portion of a sound track or video stream.

27. A method of claim 26, wherein the particular vector data comprises one or more members of a group comprising: data that indicates time-variable text to be converted to speech; time-variable data that indicates intensity level for each of one or more wavelength bands; time-variable data that indicates amplification level for each of one or more wavelength bands; and
time-variable data that indicates expansion level for one or more time or distance bands.

28. A method comprising:
in response to a first request for a particular tile of dynamic content to be sent, transmitting data that indicates an estimated time to complete generation of the particular tile; and
causing a second request for the particular tile to be received at a time based at least in part on the estimated time.

29. A method of claim 28, further comprising causing an operation to be performed during a time interval between transmitting the data that indicates the estimated time and causing the second request to be sent, wherein the operation is independent of the first request and the second request and determining whether a response to the first request or the second request is transmitted.

* * * * *